(12) United States Patent
Kawarada et al.

(10) Patent No.: US 12,021,569 B2
(45) Date of Patent: Jun. 25, 2024

(54) UNDERWATER COMMUNICATION DEVICE AND UNDERWATER COMMUNICATION METHOD

(71) Applicant: WASEDA UNIVERSITY, Tokyo (JP)

(72) Inventors: Hiroshi Kawarada, Tokyo (JP); Yutaro Iyama, Tokyo (JP); Miki Kajiya, Tokyo (JP); Kaito Tadenuma, Tokyo (JP); Yukihiro Shintani, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 784 days.

(21) Appl. No.: 17/272,597

(22) PCT Filed: Aug. 30, 2019

(86) PCT No.: PCT/JP2019/034265
§ 371 (c)(1),
(2) Date: Sep. 29, 2021

(87) PCT Pub. No.: WO2020/050183
PCT Pub. Date: Mar. 12, 2020

(65) Prior Publication Data
US 2022/0014279 A1     Jan. 13, 2022

(30) Foreign Application Priority Data

Sep. 4, 2018   (JP) .................. 2018-165527

(51) Int. Cl.
*H04B 13/02*     (2006.01)
*H04B 1/04*      (2006.01)
*H04B 1/16*      (2006.01)

(52) U.S. Cl.
CPC .............. *H04B 13/02* (2013.01); *H04B 1/04* (2013.01); *H04B 1/1607* (2013.01)

(58) Field of Classification Search
CPC ........ H04B 13/02; H04B 1/04; H04B 1/1607; H04B 11/00; Y02D 30/70
See application file for complete search history.

(56) References Cited

U.S. PATENT DOCUMENTS 3,668,617 A * 6/1972 Brainard, II .......... H04B 13/02
                                                     340/852
5,206,640 A * 4/1993 Hirvonen ................. G01V 3/02
                                                     324/72

(Continued)

FOREIGN PATENT DOCUMENTS

CN    109799534 A    5/2019
JP    2009278455 A   11/2009

(Continued)

*Primary Examiner* — Daniel Pihulic
(74) *Attorney, Agent, or Firm* — Fox Rothschild LLP; Carol E. Thorstad-Forsyth

(57) ABSTRACT

The invention is to provide an underwater communication device and an underwater communication method that can be applied to mobile communication in water. An underwater communication device 10 includes: a transmitter 12 configured to transmit an electric signal; and a receiver 14 arranged away from the transmitter 12 via water and configured to receive the electric signal, in which the receiver 14 includes an field effect transistor 23 having a channel region 39 provided at a position in contact with the water, and a drive circuit 26 configured to generate a potential difference between a source region 31 and a drain region 33 of the field effect transistor 23.

6 Claims, 16 Drawing Sheets

(56) References Cited

U.S. PATENT DOCUMENTS

2018/0287222 A1* 10/2018 Goodenough ...... H01M 10/054
2019/0148763 A1*  5/2019 Goodenough .......... H01M 4/38
                                                   429/322
2022/0014279 A1*  1/2022 Kawarada ............ H04B 1/1607

FOREIGN PATENT DOCUMENTS

| JP | 2012233876 A | 11/2012 | |
|---|---|---|---|
| JP | 7329854 B2 * | 8/2023 | ............... H04B 1/04 |
| WO | 2018051932 A1 | 3/2018 | |
| WO | WO-2020050183 A1 * | 3/2020 | ............... H04B 1/04 |

* cited by examiner

UNDERWATER COMMUNICATION DEVICE AND UNDERWATER COMMUNICATION METHOD

CROSS REFERENCE TO RELATED APPLICATIONS

The present application is a U.S. National Phase of International Patent Application No. PCT/JP2019/034265, filed Aug. 30, 2019, which claims the benefit and priority of Japanese Patent Application No. 2018-165527 which was filed on Sep. 4, 2018. The entirety of these applications are incorporated herein by reference.

TECHNICAL FIELD

The present invention relates to an underwater communication device and an underwater communication method, and is particularly applicable to wireless communication.

BACKGROUND ART

Various communication media such as sound waves or radio frequency waves are used in wireless communication between mobile objects in water such as a sea. For example, the sound waves have little signal attenuation and a long transmission distance, but have a small transmission capacity and a low transmission speed. The radio frequency waves are not practical since the radio frequency waves have a very large attenuation rate.

On the other hand, a wireless communication method using light has less light absorption in seawater and is suitable as the communication medium. Underwater wireless communication using a laser as a light source is proposed (for example, PTL 1).

CITATION LIST

Patent Literature

PTL 1: JP-A-2009-278455

SUMMARY OF INVENTION

Technical Problem

However, in a case of PTL 1, since the laser has high directivity, it is necessary to align a transmitter and a receiver with high accuracy, and therefore there is a problem that it is difficult to apply the laser to mobile communication.

An object of the invention is to provide an underwater communication device and an underwater communication method that can be applied to mobile communication in water.

Solution to Problem

An underwater communication device according to the invention includes: a transmitter configured to transmit an electric signal; and a receiver arranged away from the transmitter via water and configured to receive the electric signal, in which the receiver includes an field effect transistor having a channel region provided at a position in contact with the water, and a drive circuit configured to generate a potential difference between a source region and a drain region of the field effect transistor.

An underwater communication method according to the invention includes: a transmitting step of transmitting an electrical signal in water; and a receiving step of receiving the electrical signal via the water, in which in the receiving step, the electric signal is received by a field effect transistor having a channel region provided at a position in contact with the water.

Advantageous Effect

According to the invention, since the electric signal has a small attenuation rate in the water, the electric signal transmitted from the transmitter can reach the receiver arranged apart from the transmitter in the water. Further, since the electric signal is isotropically dispersed and propagates in the water, the electric signal transmitted from the transmitter can be received by the receiver which is not accurately aligned with the transmitter. Therefore, the underwater communication device according to the present embodiment using the electric signal can be applied to the mobile communication in the water.

BRIEF DESCRIPTION OF DRAWINGS

FIGS. 5A to 5C are graphs showing an experimental result (1), in which FIG. 5A shows an input waveform, FIG. 5B shows an output waveform when a distance is 0.01 m, and FIG. 5C shows an output waveform when the distance is 5 m.

FIGS. 6A and 6B are graphs showing I-V characteristics, in which FIG. 6A shows a case where the distance is 0.01 m, and FIG. 6B shows a case where the distance is 5 m.

FIGS. 8A and 8B are graphs showing an experimental result (2), in which FIG. 8A shows an input waveform, and FIG. 8B shows an output waveform.

FIGS. 9A and 9B are graphs showing an experimental result (3), in which FIG. 9A shows an input waveform, and FIG. 9B shows an output waveform.

FIGS. 10A and 10B are graphs showing an experimental result (4), in which FIG. 10A shows an input waveform, and FIG. 10B shows an output waveform.

FIGS. 11A and 11B are graphs showing an experimental result (5), in which FIG. 11A shows an input waveform, and FIG. 11B shows an output waveform.

FIGS. 12A and 12B are graphs showing an experimental result (6), in which FIG. 12A shows an input waveform, and FIG. 12B shows an output waveform.

FIGS. 13A and 13B are graphs showing the I-V characteristics, in which FIG. 13A shows a case where the distance is 1 m, and FIG. 13B shows a case where the distance is 10 m.

FIGS. 16A and 16B are graphs showing an experimental result (7), in which FIG. 16A shows an input waveform, and FIG. 16B shows an output waveform.

FIGS. 18A to 18C are graphs showing an experimental result (8), in which FIG. 18A shows an input waveform, FIG. 18B shows an output waveform when the distance is 0.1 m, and FIG. 18C shows an output waveform when the distance is 5 m.

FIGS. 20A to 20C are graphs showing an experimental result (9), in which FIG. 20A shows an input waveform, FIG. 20B shows an output waveform when the distance is 0.1 m, and FIG. 20C shows an output waveform when the distance is 0.5 m.

DESCRIPTION OF EMBODIMENTS

1. First Embodiment

Hereinafter, a first embodiment of the invention will be described in detail with reference to the drawings. The present embodiment shows an example of the invention, and the invention is not limited to the present embodiment.
(Overall Configuration)

Figure 1:
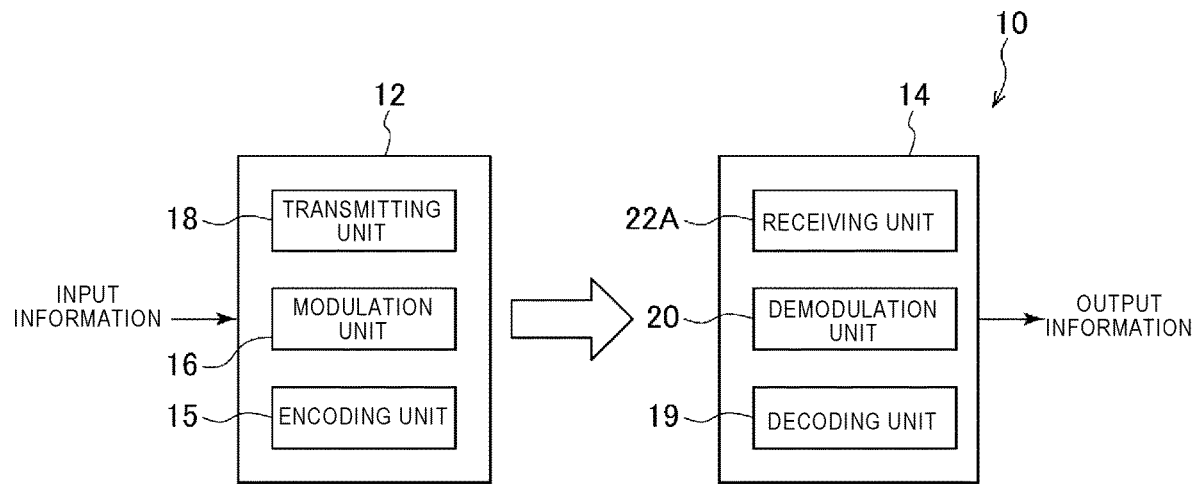
FIG. 1 is a schematic diagram showing an underwater communication device according to a first embodiment.

An underwater communication device 10 shown in FIG. 1 includes a transmitter 12 and a receiver 14. The underwater communication device 10 is immersed in water, or seawater in a case of the present embodiment. The transmitter 12 and the receiver 14 are arranged via the seawater as a communication path. A distance between the transmitter 12 and the receiver 14 is not particularly limited. The distance between the transmitter 12 and the receiver 14 is, for example, about 0.01 m to 100 m, or about 1 m to 50 m.

The transmitter 12 and the receiver 14 are wirelessly connected. Although the transmitter 12 and the receiver 14 shown in this figure are shown as individual units, the invention is not limited to this. For example, the transmitter 12 may be combined with a receiver (not shown) corresponding to the receiver 14, the receiver 14 may be combined with a transmitter (not shown) corresponding to the transmitter 12, or an underwater communication device capable of bidirectional communication may be used as a whole.

The transmitter 12 transmits an electric signal. The electric signal is, for example, an AC voltage signal having an optional frequency and waveform, and is a digital signal in the case of the present embodiment. The transmitter 12 includes an encoding unit 15, a modulation unit 16, and a transmitting unit 18 which are connected in this order. The encoding unit 15 converts input information that is input into coded data suitable for transmission. When the input information is analog information, the input information is input to the encoding unit 15 in a state of being digitized by an analog-to-digital converter (not shown). The modulation unit 16 generates and outputs a modulation signal in which the coded data is superimposed on a carrier wave. The transmitting unit 18 transmits the modulation signal in the seawater.

The receiver 14 includes a receiving unit 22A, a demodulation unit 20, and a decoding unit 19 which are connected in this order. The receiving unit 22A receives and outputs the electric signal transmitted by the transmitting unit 18 via the seawater. The demodulation unit 20 converts the electric signal output by the receiving unit 22A into original coded data and outputs the coded data. The decoding unit 19 extracts original input information based on the coded data output by the demodulation unit 20 and outputs the input information as output information. When the original input information is the analog information, the output information output from the decoding unit 19 is output from the receiver 14 in a state of being analogized by a digital-to-analog converter (not shown).

Figure 2:
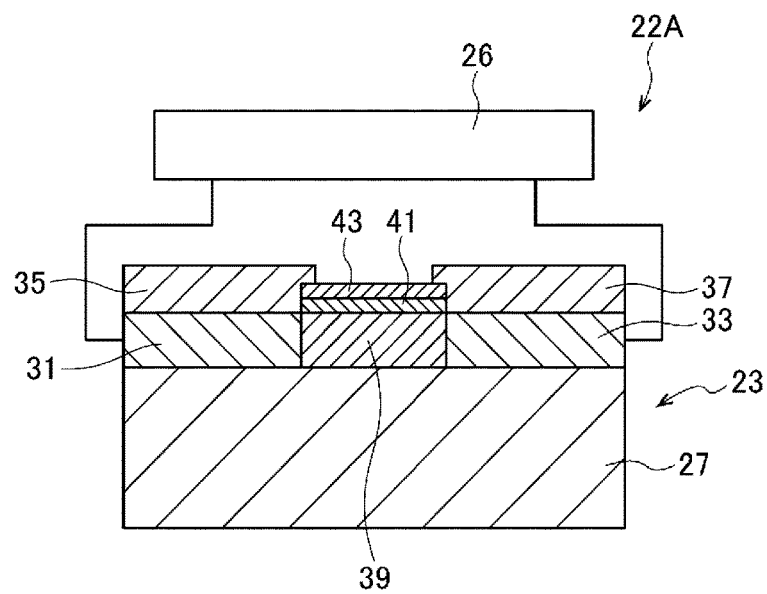
FIG. 2 is a cross-sectional view schematically showing a receiving unit according to the first embodiment.

As shown in FIG. 2, the receiving unit 22A includes a field effect transistor 23 and a drive circuit 26 that applies a potential difference between a source region 31 and a drain region 33 of the field effect transistor 23.

The field effect transistor 23 shown in FIG. 2 is called an ion-sensitive field-effect transistor (ISFET) since water is guided to a channel region 39. The field effect transistor 23 shown in this figure is called a silicon ISFET.

The field effect transistor 23 shown in FIG. 2 includes a silicon substrate 27, the source region 31 provided on one side, and the drain region 33 provided on the other side of one main surface of the silicon substrate 27. A region between the source region 31 and the drain region 33 is a region that functions as a channel when the field effect transistor 23 is operated (hereinafter, referred to as the channel region) 39.

Dimensions of the channel region 39 are set as appropriate. For example, a channel length is set to a value of about 10 to 1000 μm, and a channel width is set to a value of about 0.01 to 50 mm. The field effect transistor 23 can be either a P-channel type or an N-channel type by introducing impurities.

An oxide film 41 made of $SiO_2$ is formed on the channel region 39 and an ion-sensitive film 43 is formed on the oxide film 41. The oxide film 41 functions as a gate insulating film of the ISFET. The ion-sensitive film 43 is a film having a function of generating a voltage on a surface of the channel region 39 by interacting with ions in the seawater when the film comes into contact with the seawater. In the case of the present embodiment, the ion-sensitive film 43 also has a role of protecting the oxide film 41 from the ions. As the ion-sensitive film 43, for example, $Si_3N_4$, $Al_2O_3$, $Ta_2O_5$, $TiO_2$, and an amorphous carbon film can be used. The drive circuit 26 is electrically connected to the source region 31 and the drain region 33.

Surfaces of the source region 31 and the drain region 33, and side surfaces of the oxide film 41 and the ion-sensitive film 43 are covered with protective films 35 and 37. The protective films 35 and 37 are films that prevent the source region 31, drain region 33, and channel region 39 from conducting with each other through the seawater when the field effect transistor 23 is immersed in the seawater. As a material of the protective films 35 and 37, for example, oxides (glass, Pyrex (registered trademark), or the like), nitrides (silicon nitride, or the like), resists, and organic substances (Teflon (registered trademark) fluorine resin, or the like) are preferably used. A thickness of the protective films 35 and 37 is preferably 0.1 μm or more and 1 mm or less.

The drive circuit 26 that drives the field effect transistor 23 is electrically connected to the source region 31 and the drain region 33. For example, although not shown in this figure, the source region 31 may be grounded, and the drain region 33 may be grounded via a resistor or a DC power supply. The source region 31 and the drain region 33 are grounded in a state of being electrically separated from the transmitter 12. That is, the transmitter 12 and the receiver 14 are electrochemically connected only through the seawater.

The channel region 39 of the field effect transistor 23 is in contact with the seawater. The receiver 14 is preferably accommodated in a waterproof case (not shown). The case includes a window leading to the outside. The field effect transistor 23 is arranged such that the surface on a channel region 39 side is exposed to the outside from the window. The seawater is in contact with the channel region 39 through the window. It is preferable that a sealing material is provided inside the window between the window and a surface of the field effect transistor 23 to prevent the seawater from entering the case through a space between the window and the surface of the field effect transistor 23.

(Function and Effect)

A method of communicating in the seawater using the underwater communication device 10 will be described. First, the transmitter 12 and the receiver 14 are immersed in the seawater. At that time, the transmitter 12 and the receiver 14 are individually grounded. The channel region 39 of the field effect transistor 23 is electrochemically connected to the transmitting unit 18 via the seawater.

Using the drive circuit 26, a voltage is applied to one or both of the source region 31 and the drain region 33 of the field effect transistor 23 such that the potential difference is generated between the source region 31 and the drain region 33 (between a drain and a source). The potential difference provided between the drain and the source is preferably −2 V or more and 2 V or less. The voltage may be applied to the source region 31 and the drain region 33 even before the field effect transistor 23 is immersed in the seawater.

The transmitter 12 generates a predetermined modulation signal based on the input information that is input, and generates the electric signal based on the modulation signal. The transmitting unit 18 transmits the electric signal in the seawater, which is the communication path. The electric signal transmitted by the transmitting unit 18 propagates in the seawater while being isotropically dispersed, and reaches the receiving unit 22A of the receiver 14.

The voltage is applied to the surface of the channel region 39 by the electric signal reaching the receiving unit 22A. When the voltage is applied to the channel region 39, a channel is induced between the source region 31 and the drain region 33 (channel region 39), and a drain current $I_{DS}$ flowing in the channel is changed according to the potential difference between the source region 31 and the drain region 33 (between the drain and the source). The current $I_{DS}$ here has $I_V$ characteristics that can be obtained with a normal field effect transistor, as will be described later as an example.

As described above, the receiving unit 22A detects the electric signal transmitted by the transmitting unit 18 by detecting a change in the drain current $I_{DS}$ as a change in a drain-source voltage (output voltage) $V_{DS}$. The receiver 14 extracts the original information from the electric signal and outputs the information as the output information.

Since the electric signal has a small attenuation rate in the seawater, the electric signal transmitted from the transmitter 12 can reach the receiver 14 arranged apart from the transmitter 12 in the seawater. Further, since the electric signal is isotropically dispersed and propagates in the seawater, it is not necessary to align the transmitter 12 and the receiver 14 with high accuracy. Therefore, the underwater communication device 10 according to the present embodiment using the electric signal can be applied to mobile communication in the seawater, for example, communication with a robot moving in the seawater.

The protective films 35 and 37 cover the source region 31 and the drain region 33 of the field effect transistor 23 to prevent the seawater from coming into contact with the source region 31 and the drain region 33, so that the field effect transistor 23 can operates stably.

2. Second Embodiment

Next, a receiving unit according to a second embodiment will be described. In the case of the above embodiment, a case where the silicon ISFET is used as the field effect transistor of the receiving unit is described, but the invention is not limited to this. A field effect transistor 24 shown in FIG. 3 includes a silicon substrate 28, a diamond thin film 30 formed on one main surface of the silicon substrate 28, a source electrode 32 and a drain electrode 34 formed on the diamond thin film 30, a protective film 36 that covers a surface of the source electrode 32, and a protective film 38 that covers a surface of the drain electrode 34. Since the field effect transistor 24 includes the diamond thin film 30 and does not include an oxide in a wetted portion of the diamond thin film 30, the field effect transistor 24 is called a diamond electrolyte solution gate (SG) FET (hereinafter referred to as a diamond SGFET).

On a surface of the diamond thin film 30, the source electrode 32 is provided on one side (a source region) and the drain electrode 34 is provided on the other side (a drain region) with a portion that functions as the channel (a channel region) 40 provided therebetween.

Dimensions of the channel region 40 are set as appropriate according to characteristics of a receiving unit 22B. For example, the channel length is set to a value of about 10 to 1000 μm, and the channel width is set to a value of about 0.01 to 50 mm. A length of the source electrode 32 and the drain electrode 34 is set to a value of about 0.01 to 50 mm, and a width of the source electrode 32 and the drain electrode 34 is set to a value of about 0.01 to 100 mm.

The channel region 40 is provided with a hydrogenated layer that is subjected to hydrogen termination treatment. The hydrogenated layer is formed by hydrogen-terminating the surface of the diamond thin film 30 between the drain electrode 34 and the source electrode 32. As is well known, the hydrogen termination is a state in which hydrogen is bonded to an unbounded hand (dangling bond) of a carbon atom on the surface of the diamond thin film 30. The hydrogenated layer forms a P-type conductive layer (a channel, not shown) by inducing two-dimensional hole gas (2DHG) directly under the hydrogenated layer by binding the ions to a surface of the hydrogenated layer.

(Manufacturing Method)

A method of manufacturing the field effect transistor 24 will be described. First, a nucleating process is performed in which diamond powder is nucleated on the one main surface of the polished silicon substrate 28. As a method of nucleating the diamond powder, a method of applying a solution including diamond fine particles to the surface of the silicon substrate 28 by an ultrasonic method, an immersion method, or another method and drying the solvent can be used, for example.

Next, the diamond thin film 30 is formed on the surface of the silicon substrate by, for example, a thermal filament CVD method. Specifically, a carbon source (for example, a low molecular weight organic compound such as methane, alcohol, or acetone) is supplied to a filament together with hydrogen gas or the like. Then, the filament is heated to a temperature range (for example, 1800 to 2800° C.) in which carbon radicals and the like are generated, and the silicon substrate 28 is arranged in this atmosphere so as to be in a temperature range in which diamond is deposited (for example, 750 to 950° C.)

After that, the diamond thin film 30 formed on the silicon substrate 28 is subjected to the hydrogen termination treatment. Specifically, a process is performed in which a carbon termination on the surface of the formed diamond thin film 30 is replaced with the hydrogen termination to obtain a high-density hydrogen termination. As the hydrogen termination treatment, any one of treatment with a hydrofluoric acid aqueous solution, hydrogen plasma treatment, heat treatment in a hydrogen atmosphere, hydrogen radical treatment, and cathode reduction method can be selected.

Next, a process is performed in which a resist is spin-coated on the surface of the diamond thin film 30 formed on the silicon substrate 28, and exposure and development are performed to pattern the resist. Then, Au/Ti sputtering and lift off are performed to form an Au/Ti thin film on the one main surface of the silicon substrate 28. Accordingly, the source electrode 32 and the drain electrode 34 are formed on the silicon substrate 28.

Subsequently, a process is performed in which the resist to be the protective films 36 and 38 is spin-coated on the silicon substrate 28 on which the diamond thin film 30 and the Au/Ti thin film are formed, and the resist is patterned by the exposure and the development. A region where the resist is removed is in a state where the diamond thin film 30 is exposed. The region where the diamond thin film 30 is exposed functions as the channel. As described above, the field effect transistor 24 can be obtained.

3. Modification

The invention is not limited to the above embodiments, and can be appropriately modified within the scope of the gist of the invention. In the case of the above embodiments, a case where the water is the seawater is described, but the invention is not limited to this, and may also be applied to, for example, blood, saliva, body fluid, rainwater, tap water, salt water, electrolytic solution, and groundwater.

EXAMPLES (Example 1) Verification Using Diamond SGFET

Figure 3:
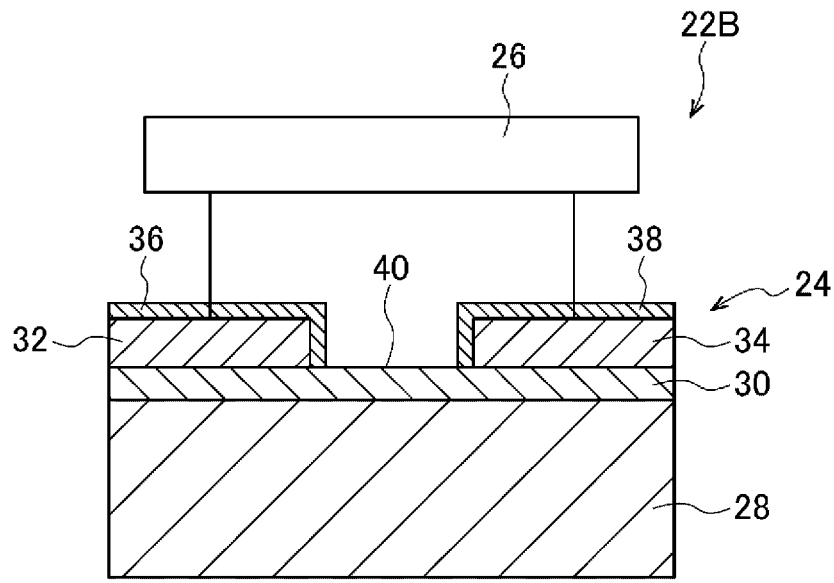
FIG. 3 is a cross-sectional view schematically showing a receiving unit according to a second embodiment.

A diamond SGFET having a configuration shown in FIG. 3 was used as the receiving unit in practice, and it was verified whether the receiving unit could receive an electric signal transmitted from the transmitting unit in water. For the verification, an experimental device 58 shown in FIG. 4 was used. The transmitter 12 included a reference electrode 64 and an AC power supply 66 connected to the reference electrode 64. The reference electrode 64 included a metal electrode of Ag/AgCl, an internal electrolyte of saturated KCl, and a tubular glass container accommodating the metal electrode and the internal electrolyte. The AC power supply 66 transmitted a pulse wave having a frequency of 100 kHz as the electric signal through a function generator (not shown) having a voltage of −0.8±0.2 V and capable of generating the electric signal having an optional frequency and waveform. The function generator was grounded.

The receiving unit 22B included the field effect transistor 24 and a DC power supply 69 connected to the drain electrode via a resistor 67. For the field effect transistor 24, a channel length was set to 10 μm, a channel width was set to 1 mm, a length of the source electrode and the drain electrode was set to 0.5 mm, and a width of the source electrode and the drain electrode was set to 1 mm.

The resistor 67 having a resistance of 100Ω was used. A voltage of the DC power supply 69 was −2.0 V. The DC power supply 69 and the source electrode were grounded. The reference electrode 64 and the field effect transistor 24 were arranged in a hose 68 filled with salt water having a NaCl concentration of 3.5 mass %. The hose 68 having a radius of 1.25 cm was used. The function generator and the receiving unit 22B were grounded after being connected to a common ground bus.

Figure 5A:
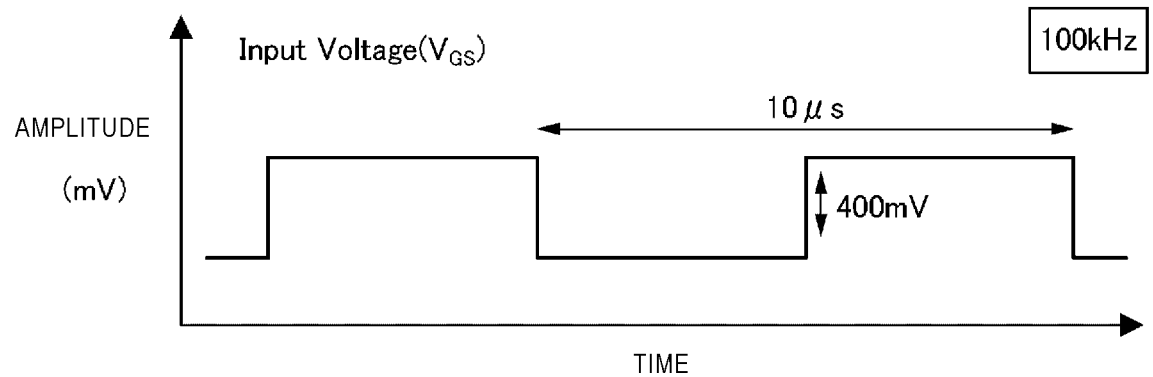
Figure 5B:
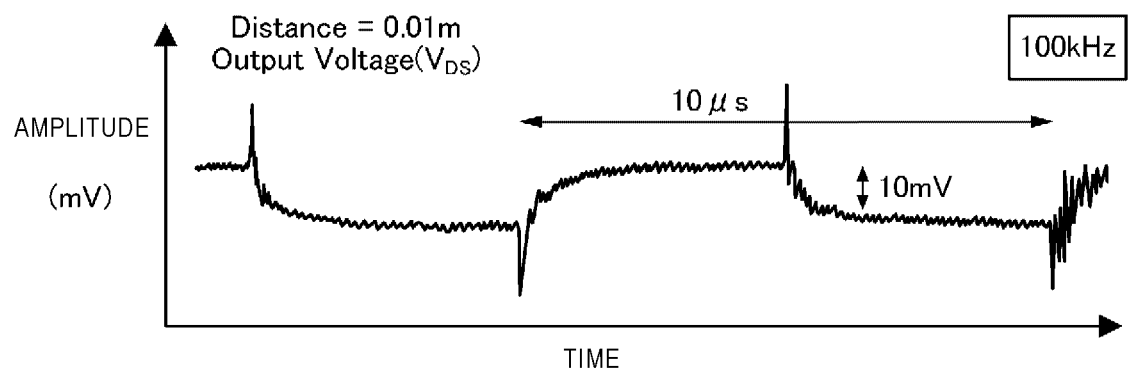
Figure 5C:
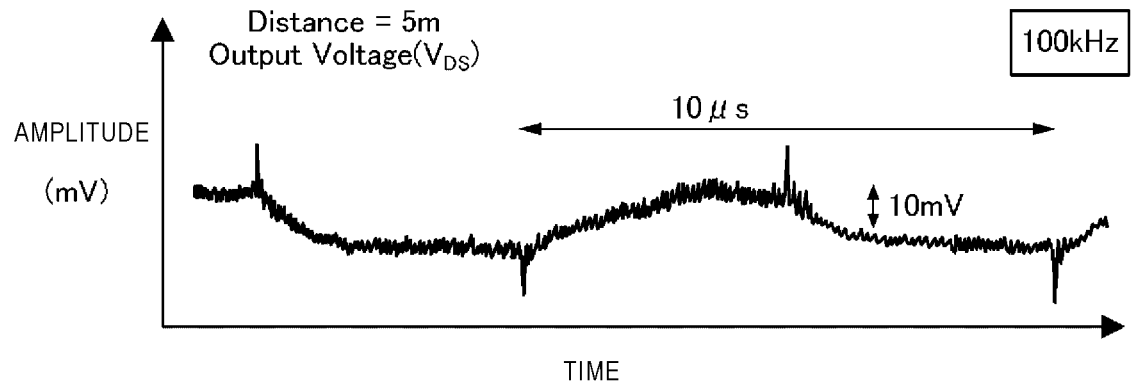

An output voltage $V_{DS}$ of the field effect transistor 24 with respect to the electric signal transmitted from the reference electrode 64 was measured when a distance between the reference electrode and the channel was 0.01 m and when the distance was 5 m. Results are shown in FIGS. 5A, 5B and 5C. In FIGS. 5A, 5B, and 5C, a horizontal axis represents time (μs) and a vertical axis represents amplitude (mV). FIG. 5A shows the electric signal (input signal) transmitted from the transmitter 12, FIG. 5B shows an output voltage $V_{DS}$ when the distance is 0.01 m, and FIG. 5C shows an output voltage $V_{DS}$ when the distance is 5 m.

With respect to a rectangular wave with a period of 10 μs and an amplitude of 400 mV input from the reference electrode 64, the waveforms of the output voltage $V_{DS}$ of the field effect transistor 24 when the distance between the reference electrode and the channel was 0.01 m and when the distance was 5 m were inverted rectangular waves at the same period and with an amplitude of 10 mV. From the results, it was confirmed that the field effect transistor 24 responded stably and at high speed to a change in a potential no matter the distance between the reference electrode and the channel was 0.01 m or 5 m. It was found that when the frequency of the input signal was 100 kHz, the attenuation rate of the amplitude with respect to the input signal did not change when the distance between the reference electrode and the channel was in a range of 0.01 m to 5 m.

Figure 6A:
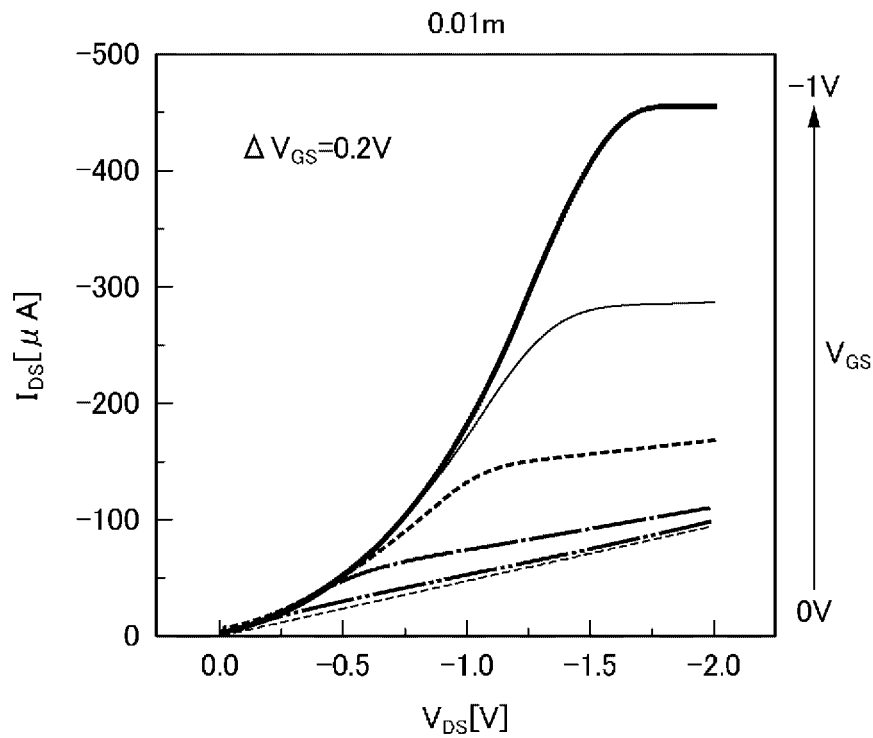
Figure 6B:
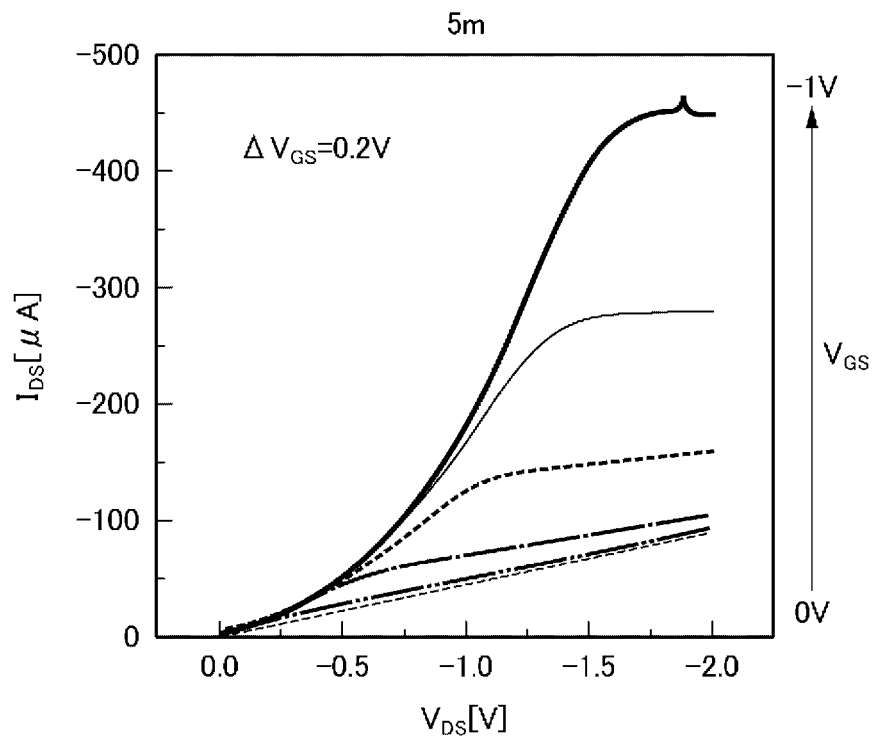

FIGS. 6A and 6B show results of measuring I-V characteristics of the field effect transistor 24. In FIGS. 6A and 6B, a horizontal axis represents a drain-source voltage $V_{DS}$ (V), and a vertical axis represents a drain-source current (drain current) $I_{DS}$ (μA). A gate-source voltage $V_{GS}$ changed by 0.2 V in a range of 0 V to −1 V. FIG. 6A shows the results when the distance is 0.01 m, and FIG. 6B shows the results when the distance is 5 m. From FIGS. 6A and 6B, it was confirmed that the same saturation current was obtained and stable operation was obtained regardless of the distance between the reference electrode and the channel.

(Example 2) Verification Using Silicon ISFET

Next, a silicon ISFET having the configuration shown in FIG. 2 was used as the receiving unit, and it was verified whether the receiving unit could receive an electric signal transmitted from the transmitting unit in the seawater. For the verification, a circuit configuration shown in FIG. 7 was used. When the distance between the reference electrode and the channel was 1 m and 10 m, a Pt metal electrode was used as the reference electrode 64. When the distance between the reference electrode and the channel was 50 m, the reference electrode 64 including the metal electrode of the Ag/AgCl, the internal electrolyte of the saturated KCl, and the tubular glass container accommodating the metal electrode and the internal electrolyte was used. A voltage of the AC power supply 66 was 2.0±0.2 V.

The receiving unit 22A included the field effect transistor 23 and the DC power supply 69 connected to the drain region via the resistor 67. The field effect transistor 23 was doped with phosphorus as a donor on the silicon substrate to form the source region and the drain region. The ion-sensitive film was made of $Si_3N_4$. The channel length was set to 100 μm, the channel width was set to 2 mm, the length of the source region and drain region was set to 2 mm, and the width of the source region and drain region was set to 0.2 mm. The resistor 67 having a resistance of 1 kΩ was used. The voltage of the DC power supply 69 was 2.0 V. The reference electrode 64 and the field effect transistor 23 were arranged in seawater 71, and the DC power supply 69 and the source region were grounded. The transmitter 12 and the receiver 14 were grounded after being connected to a common ground bus 73.

Figure 8A:
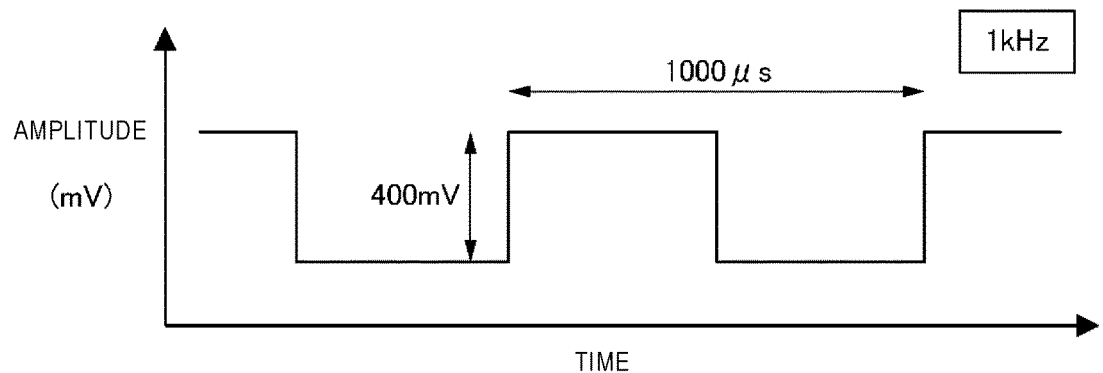
Figure 8B:
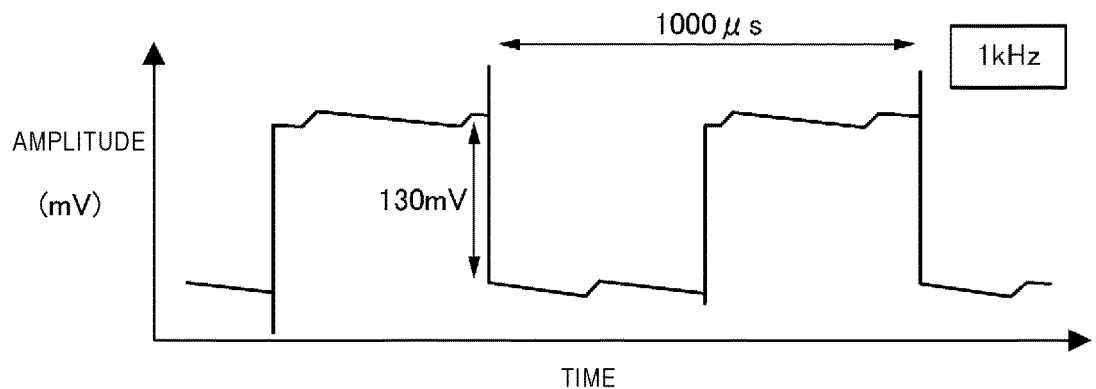

The results when the frequency of the input signal is 1 kHz and the distance between the reference electrode and the channel is 1 m are shown in FIGS. 8A and 8B. In FIGS. 8A and 8B, the horizontal axis represents the time (ms) and the vertical axis represents the amplitude (mV). FIG. 8A shows the input signal, and FIG. 8B shows the output voltage $V_{DS}$.

Figure 9A:
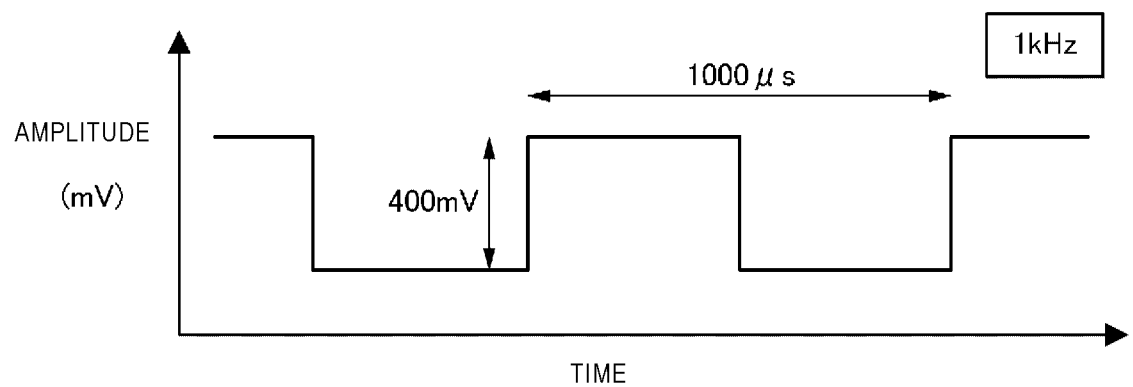
Figure 9B:
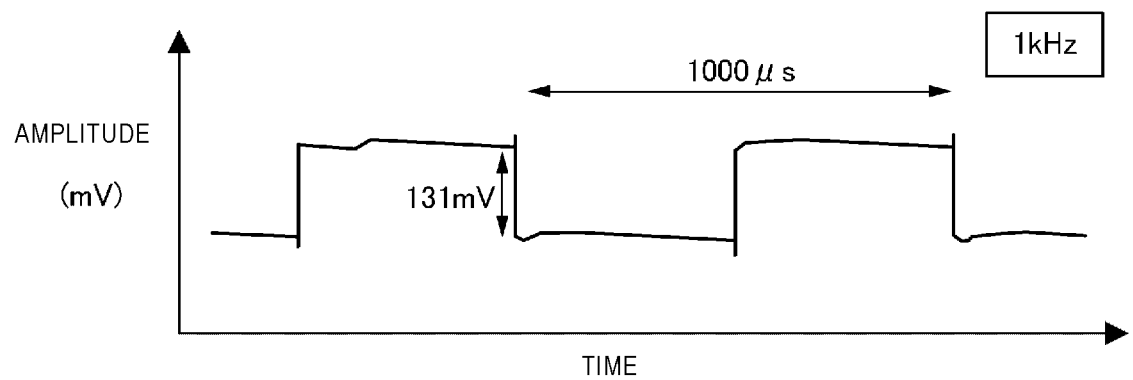

The results when the frequency of the input signal is 1 kHz and the distance between the reference electrode and the channel is 10 m are shown in FIGS. 9A and 9B. In FIGS. 9A and 9B, the horizontal axis represents the time (ms) and the vertical axis represents the amplitude (mV). FIG. 9A shows the input signal, and FIG. 9B shows the output voltage $V_{DS}$.

Figure 10A:
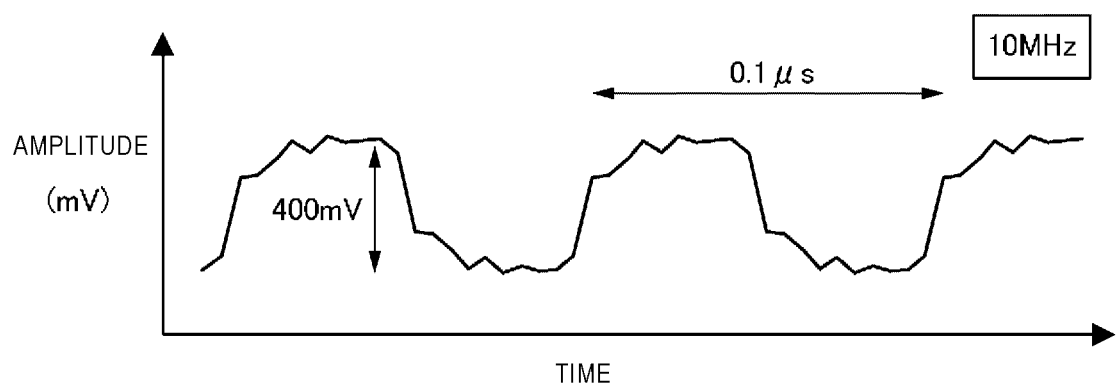
Figure 10B:
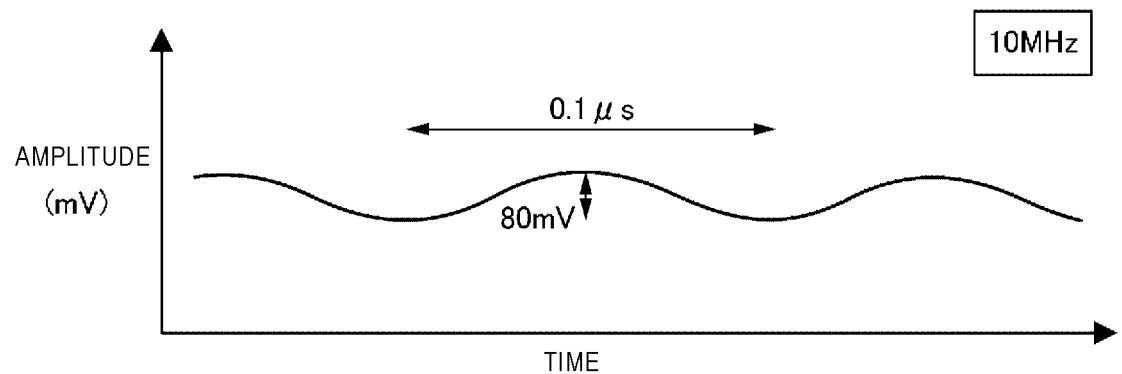

The results when the frequency of the input signal is 10 MHz and the distance between the reference electrode and the channel is 10 m are shown in FIGS. 10A and 10B. In FIGS. 10A and 10B, the horizontal axis represents the time (ms) and the vertical axis represents the amplitude (mV). FIG. 10A shows the input signal, and FIG. 10B shows the output voltage $V_{DS}$.

Figure 11A:
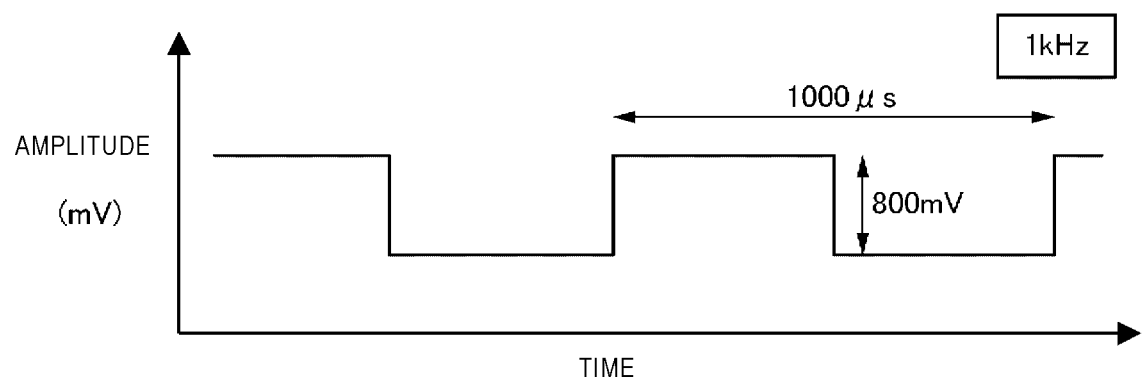
Figure 11B:
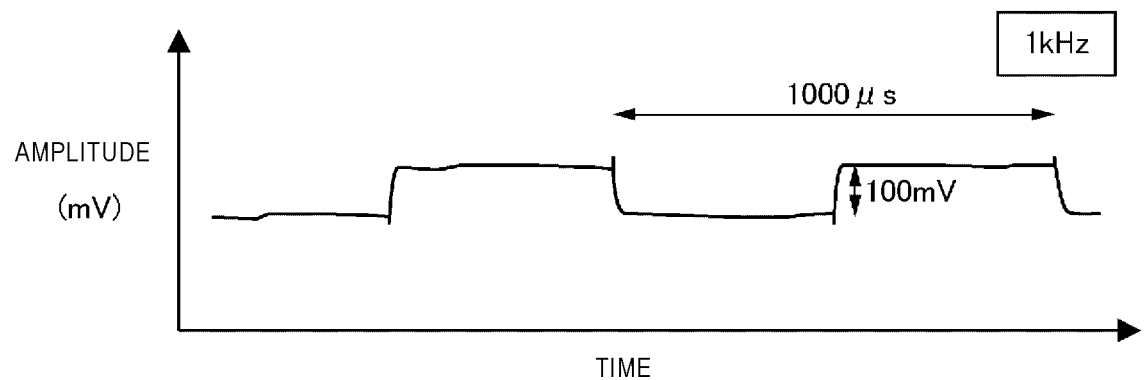

The results when the frequency of the input signal is 1 kHz and the distance between the reference electrode and the channel is 50 m are shown in FIGS. 11A and 11B. In FIGS. 11A and 11B, the horizontal axis represents the time (ms) and the vertical axis represents the amplitude (mV). FIG. 11A shows the input signal, and FIG. 11B shows the output voltage $V_{DS}$.

Figure 12A:
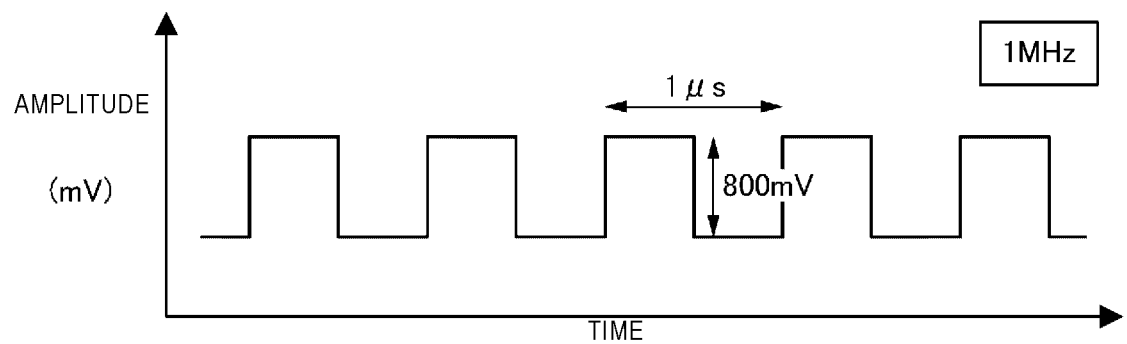
Figure 12B:
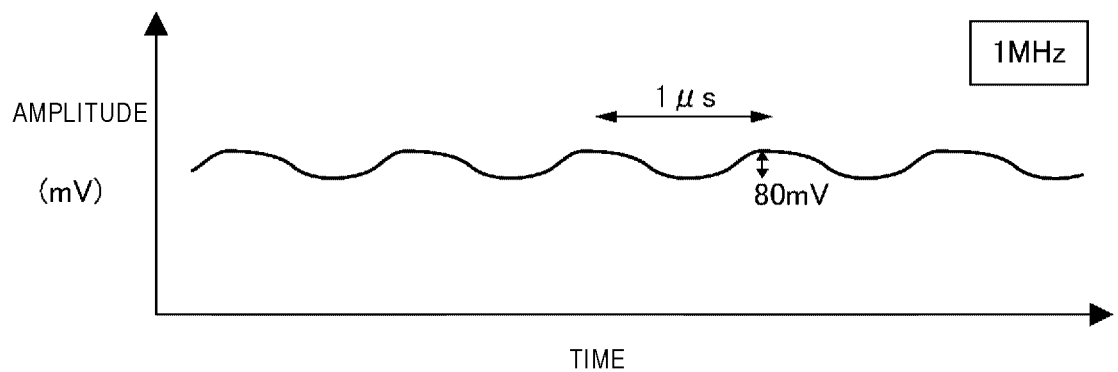

The results when the frequency of the input signal is 1 MHz and the distance between the reference electrode and the channel is 50 m are shown in FIGS. 12A and 12B. In FIGS. 12A and 12B, the horizontal axis represents the time (ms) and the vertical axis represents the amplitude (mV). FIG. 12A shows the input signal, and FIG. 12B shows the output voltage $V_{DS}$.

From FIGS. 8A, 8B, 9A, and 9B, when the frequency of the input signal was 1 kHz, with respect to a rectangular wave with a period of 1000 μs and an amplitude of 400 mV received from the reference electrode 64, the waveforms of the output voltage $V_{DS}$ of the field effect transistor 23 when the distance between the reference electrode and the channel was 1 m and when the distance was 10 m were inverted rectangular waves at the same period and with an amplitude of 130 mV. From FIGS. 11A and 11B, when the frequency of the input signal was 1 kHz, with respect to a rectangular wave with a period of 1000 μs and an amplitude of 800 mV input from the reference electrode 64, the waveform of the output voltage $V_{DS}$ of the field effect transistor 23 when the distance between the reference electrode and the channel was 50 m was an inverted rectangular wave at the same period and with an amplitude of 100 mV.

On the other hand, from FIGS. 10A and 10B, when the frequency of the input signal was 10 MHz, with respect to a sine wave with a period of 0.1 μs and an amplitude of 400 mV input from the reference electrode 64, a waveform of the output voltage $V_{DS}$ of the field effect transistor 23 when the distance between the reference electrode and the channel was 10 m was a non-inverted sine wave at the same period and with an amplitude of 80 mV. The waveform of the input signal was intended to be a pulse wave, but due to the characteristics of the function generator used, the waveform became the sine wave. It is considered that the reason why the waveform of the output voltage $V_{DS}$ was not inverted with respect to the waveform of the input signal is that a receiving system operates as a differentiating circuit (a high-pass filter) at a high frequency and reads rising and falling edges of the input signal. A fact of being the differentiating circuit is also confirmed by a fact that a rise of the input signal is an upward pulse at the output voltage and an attenuation of the input signal is a downward pulse at the output voltage in FIGS. 5A, 5B, 5C, 8A, 8B, 9A, 9B, 10A, 10B, 11A, 11B, 12A, 12B, and FIGS. 16A and 16B which will be described later.

From FIGS. 12A and 12B, when the frequency of the input signal was 1 MHz, with respect to a rectangular wave with a period of 1 μs and an amplitude of 800 mV input from the reference electrode 64, a waveform of the output voltage $V_{DS}$ of the field effect transistor 23 when the distance between the reference electrode and the channel was 50 m was an inverted sine wave at the same period and with an amplitude of 80 mV.

From the results, it was confirmed that when the distance between the reference electrode and the channel was 1 m or 10 m and the frequency of the input signal was 1 kHz or 10 MHz, and when the distance between the reference electrode and the channel was 50 m and the frequency of the input signal was 1 kHz or 1 MHz, the field effect transistor responded stably and at the high speed to the change in the potential. It was found that when the frequency of the input signal was 1 kHz, the attenuation rate of the amplitude with respect to the input signal did not change when the distance between the reference electrode and the channel was in a range of 1 m to 10 m.

Figure 7:
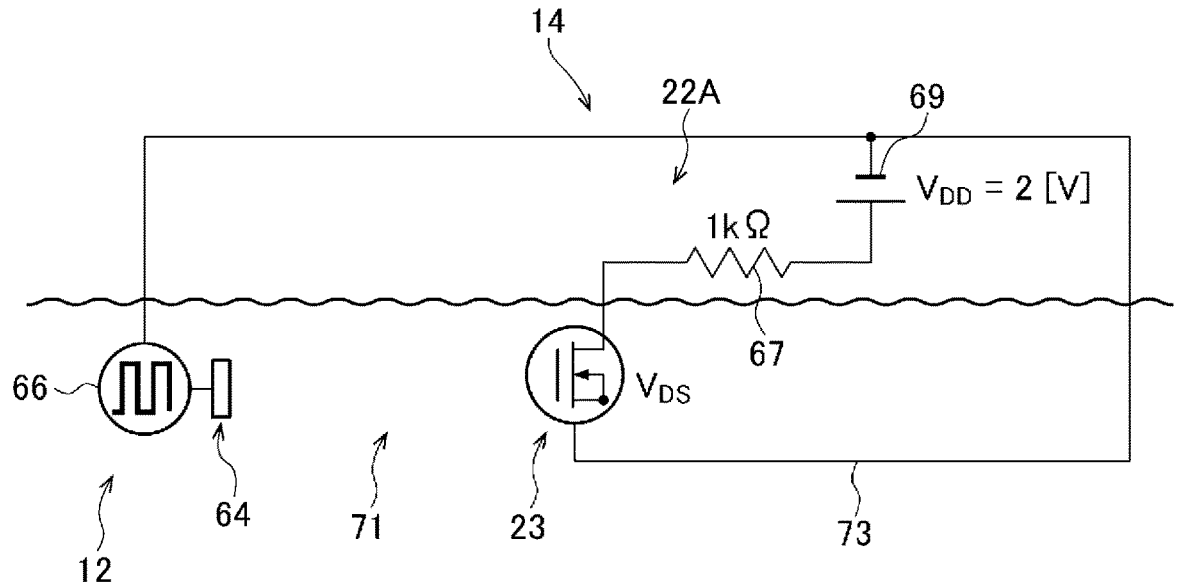
FIG. 7 is a schematic diagram showing a circuit configuration used in an experiment.

Next, the I-V characteristics of the field effect transistor 23 in the seawater were measured using a circuit configuration shown in FIG. 7. When the distance between the reference electrode and the channel was 1 m and 10 m, the Pt metal electrode was used as the reference electrode 64. When the distance between the reference electrode and the channel was 50 m, the reference electrode 64 including the metal electrode of the Ag/AgCl, the internal electrolyte of the saturated KCl, and the tubular glass container accommodating the metal electrode and the internal electrolyte was used.

Figure 13A:
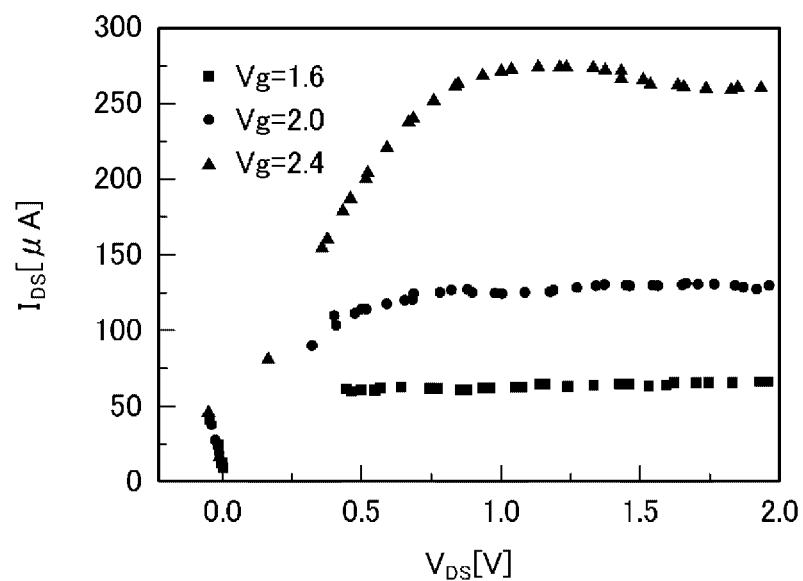
Figure 13B:
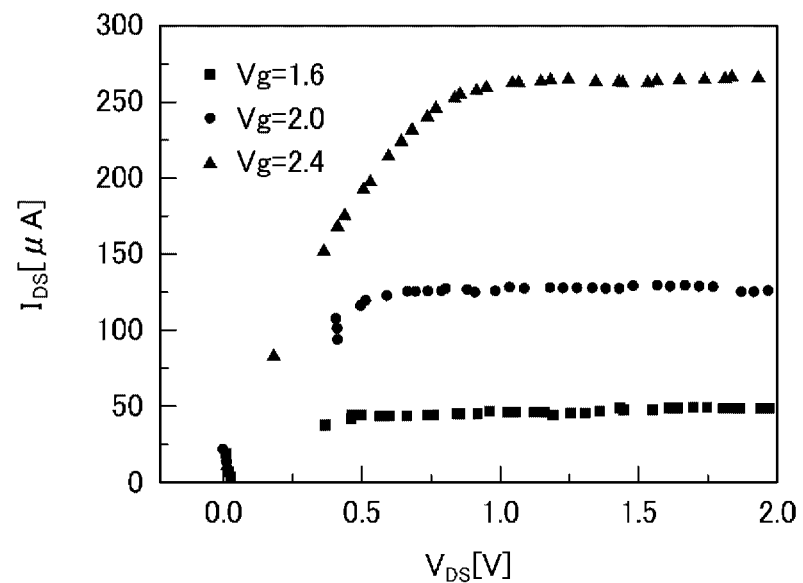
Figure 14:
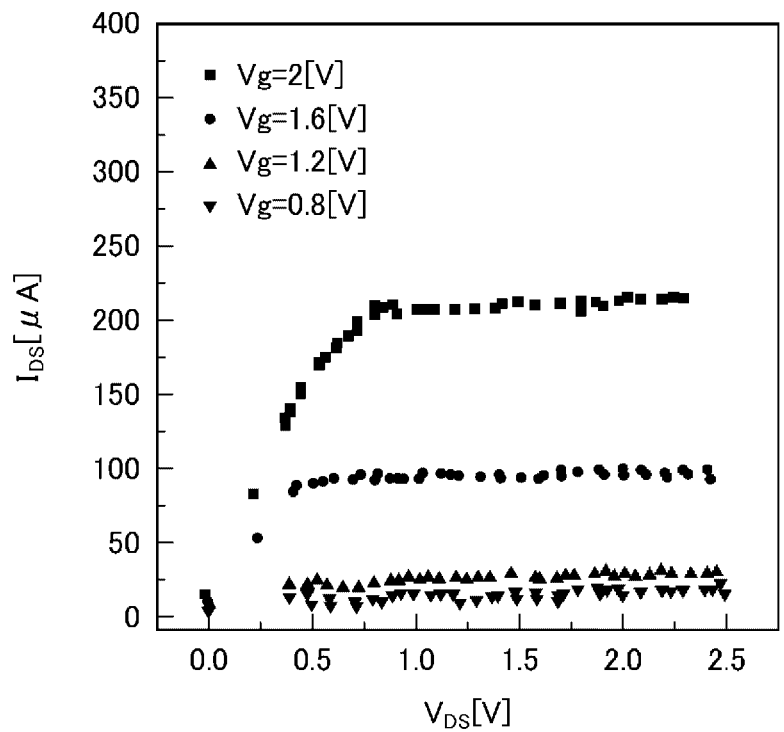
FIG. 14 is a graph showing the I-V characteristics when the distance is 50 m.

FIG. 13A shows the results when the distance is 1 m, FIG. 13B shows the results when the distance is 10 m, and FIG. 14 shows the results when the distance is 50 m. In FIGS. 13A and 13B and FIG. 14, a horizontal axis represents the drain-source voltage $V_{DS}$ (V), and a vertical axis represents the drain-source current (drain current) $I_{DS}$ (μA). From the figures, it was confirmed that the same saturation current was obtained and the stable operation was obtained regardless of the distance between the reference electrode and the channel.

(Example 3) Verification of Influence of Grounding Using Silicon ISFET

Figure 15:
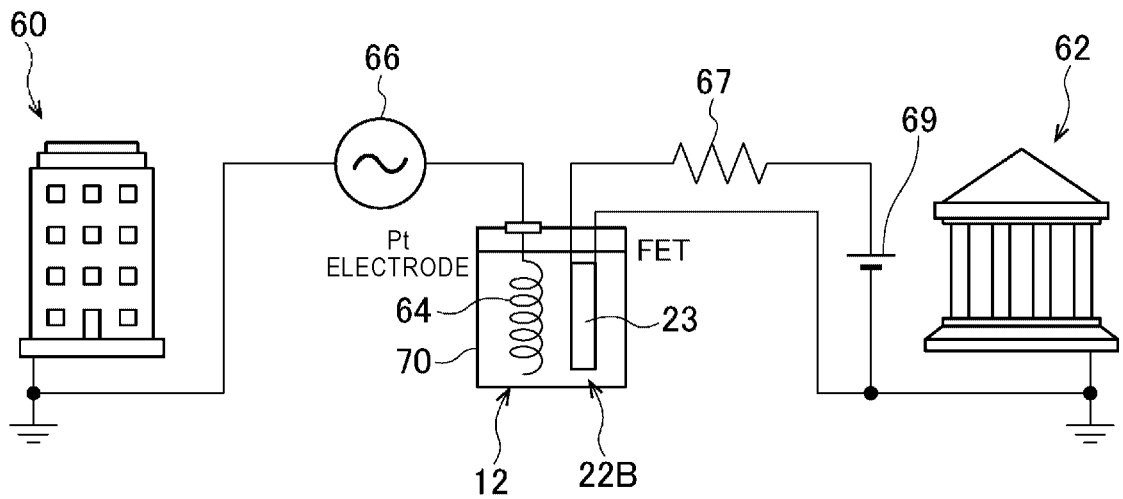
FIG. 15 is a schematic diagram showing an experimental system.

Next, it was verified whether the receiving unit could receive the electric signal transmitted from the transmitting unit in the water when the transmitting unit and the receiving unit were not connected to the common ground bus and were directly grounded, separately. For the verification, an experimental system shown in FIG. 15 was used. One of power supplies of buildings 60 and 62, which are not electrically connected to each other, was connected to the reference electrode 64, and the other was connected to the field effect transistor (silicon ISFET) 23 having the configuration shown in FIG. 2. As the reference electrode 64, the Pt metal electrode was used. The reference electrode 64 and the field effect transistor 23 were immersed in the salt water having the NaCl concentration of 3.5 mass % in a beaker 70. The resistor 67 having the resistance of 1 kΩ was used. The voltage of the DC power supply 69 was 2.0 V.

Figure 16A:
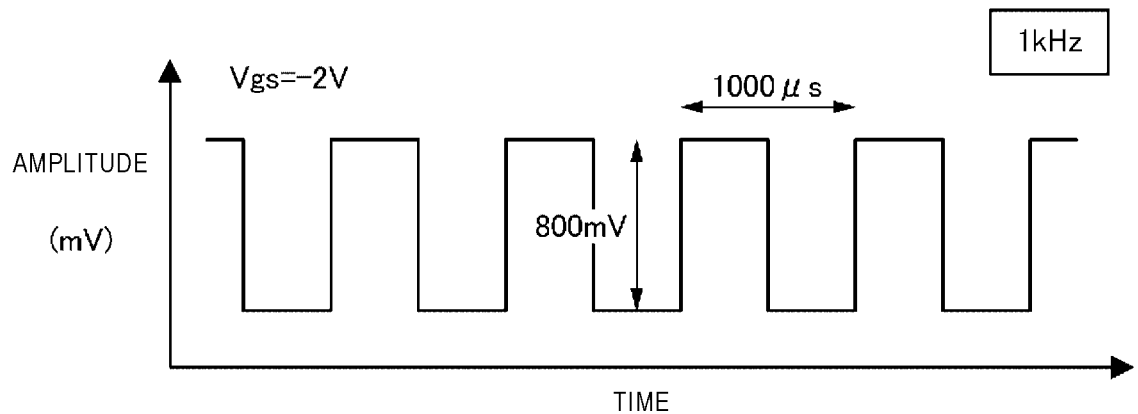
Figure 16B:
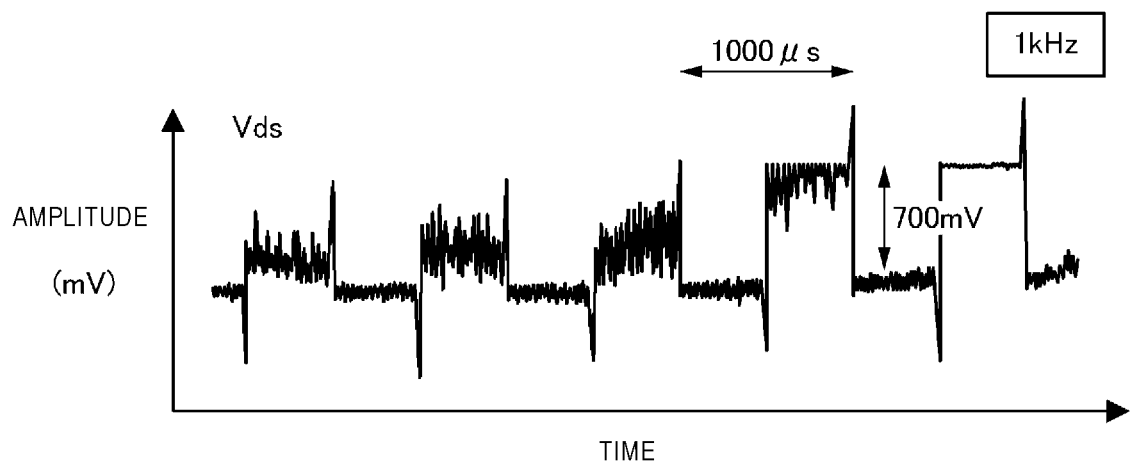

The results when the voltage of the input signal transmitted from the AC power supply 66 is 1.6±0.4 V and the frequency is 1 kHz are shown in FIGS. 16A and 16B. In FIGS. 16A and 16B, the horizontal axis represents the time (ms) and the vertical axis represents the amplitude (mV). FIG. 16A shows the input signal, and FIG. 16B shows the output voltage $V_{DS}$. With respect to a rectangular wave with a period of 1000 µs and an amplitude of 800 mV input from the reference electrode 64, a waveform of the output voltage $V_{DS}$ of the field effect transistor 23 was an inverted rectangular wave at the same period and with an amplitude of 700 mV. From the results, it was confirmed that the field effect transistor 23 responded stably and at the high speed even when the transmitting unit and the receiving unit were directly grounded, separately, without being connected to the common ground bus.

(Example 4) Verification Using Silicon ISFET and Independent Power Supply

Figure 4:
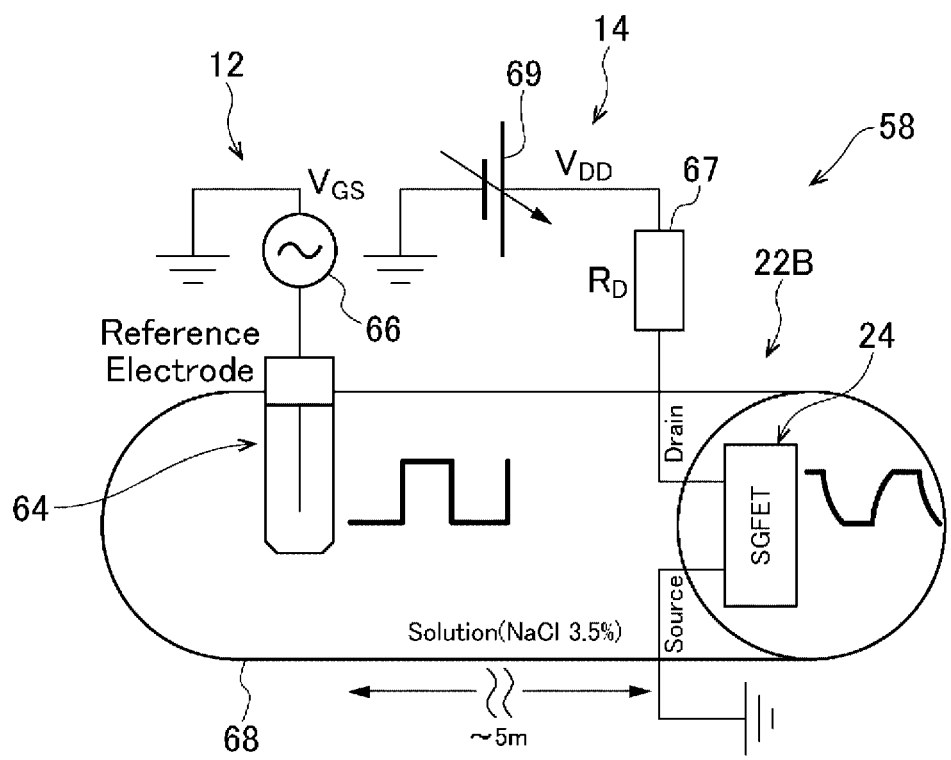
FIG. 4 is a schematic diagram showing an experimental device.
Figure 17:
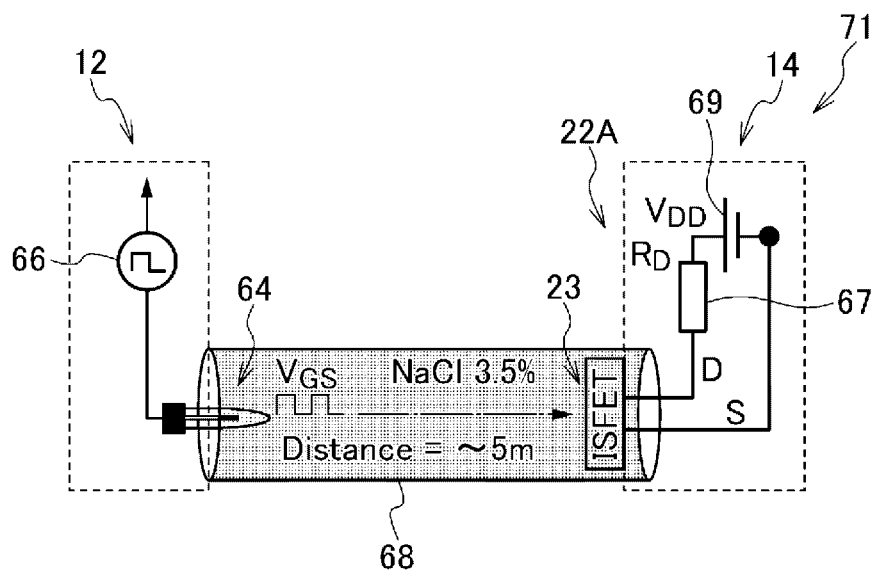
FIG. 17 is a schematic diagram showing another experimental device.

Next, it was verified whether the receiving unit could receive the electric signal transmitted from the transmitting unit in the water when the silicon ISFET was used as the receiving unit, and the transmitting unit and receiving unit were not connected to the common ground bus and were respectively connected to independent power sources that were not electrically connected to each other. For the verification, an experimental device 71 shown in FIG. 17 was used. In FIG. 17, configurations the same as those of the experimental device 58 shown in FIG. 4 are denoted by the same reference numerals.

Although not shown, in the transmitter 12, a function generator was connected to a notebook computer via an interface, and a battery built in the notebook computer was used as the AC power supply 66. The voltage of the AC power supply 66 was 1.6 V±1.0 V.

Although not shown, the receiver 14 was connected to the notebook computer via the interface, and a battery built in the notebook computer was used as the DC power supply 69. The voltage of the DC power supply 69 was 2 V. All notebook computers were used without being connected to an external power supply. As the field effect transistor 23, the same silicon ISFET as that in Example 2 was used.

The reference electrode 64 and the field effect transistor 23 were arranged in the hose 68 filled with the salt water having the NaCl concentration of 3.5 mass %. The hose 68 having an inner diameter of 2 cm was used. As described above, the transmitter 12 and the receiver 14 were electrically connected only by the salt water in the hose 68.

Figure 18A:
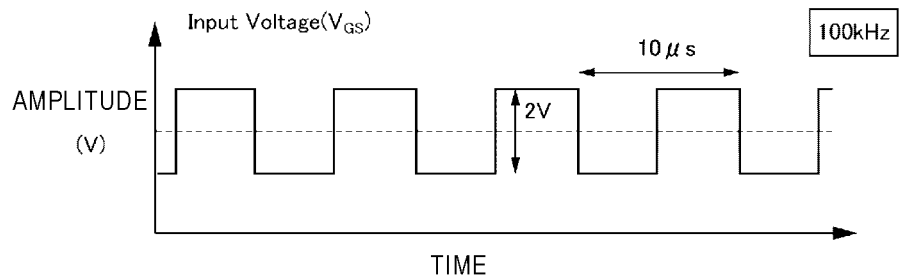
Figure 18B:
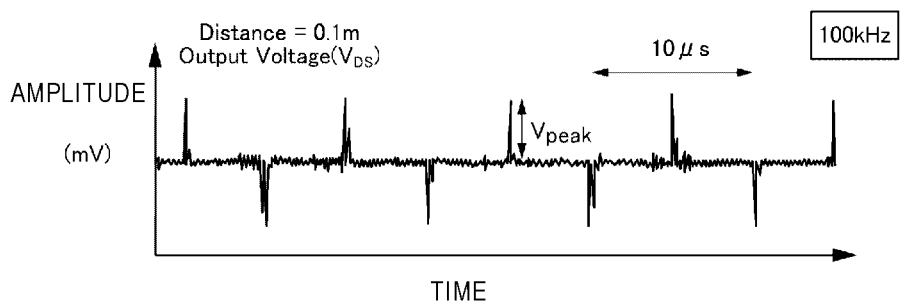
Figure 18C:
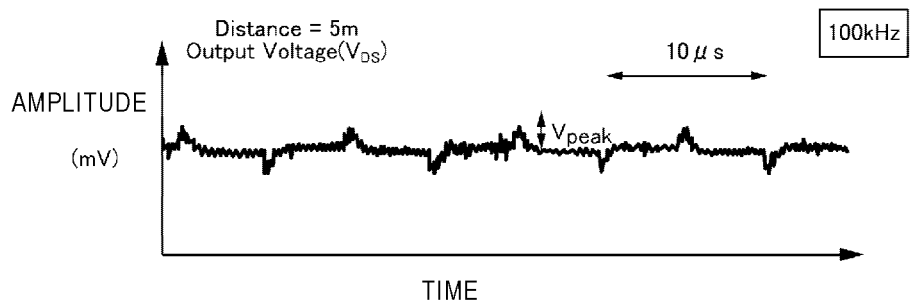

An output voltage $V_{DS}$ of the field effect transistor 23 with respect to the electric signal transmitted from the reference electrode 64 was measured when the distance between the reference electrode and the channel was 0.1 m and when the distance was 5 m. The results are shown in FIGS. 18A, 18B and 18C. In FIGS. 18A, 18B, and 18C, a horizontal axis represents the time (µs) and a vertical axis represents the amplitude (V) or (mV). FIG. 18A shows an electric signal (input signal) transmitted from the transmitter 12, FIG. 18B shows an output voltage $V_{DS}$ when the distance is 0.1 m, and FIG. 18C shows the output voltage $V_{DS}$ when the distance is 5 m.

With respect to a rectangular wave with a period of 10 µs and an amplitude of 2 V input from the reference electrode 64, the waveforms of the output voltage $V_{DS}$ of the field effect transistor 23 when the distance between the reference electrode and the channel was 0.1 m and when the distance was 5 m were both differential waveforms having peak voltages of 55 mV and 15 mV, respectively, according to rising and falling timings of the rectangular wave. Harmonic components generated at the rising and falling edges of the rectangular wave propagate in the salt water, and as a result, the potential of the channel of the field effect transistor 23 changes. When the potential of the channel changes, the drain current increases or decreases, which is observed as a change in a drain voltage. It is recognized that a potential change with the direct current is not propagated from the waveform of the output voltage $V_{DS}$.

Figure 19:
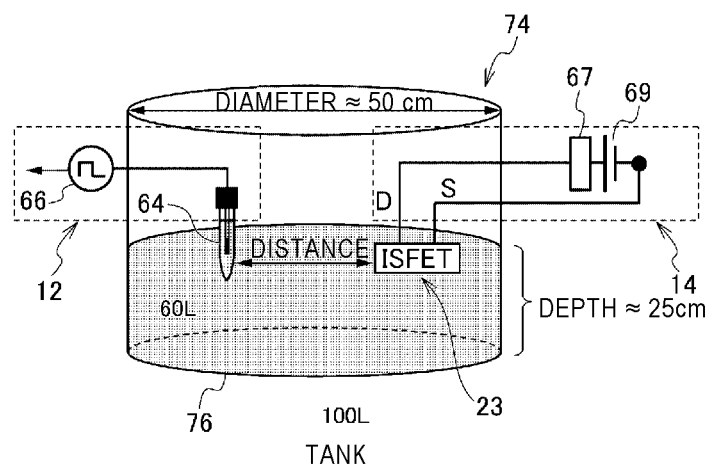
FIG. 19 is a schematic diagram showing further another experimental device.

Next, the verification was performed using an experimental device 74 shown in FIG. 19. In FIG. 19, configurations the same as those in FIGS. 4 and 17 are denoted by the same reference numerals. The experimental device 74 shown in FIG. 19 is different from the experimental device 71 of FIG. 17 in that the hose 68 is replaced with a tank 76. The tank 76 includes a columnar internal space (capacity 100 L) having a diameter of 50 cm. The tank was filled with the salt water (60 L) having the NaCl concentration of 3.5 mass %, and was provided with the reference electrode 64 and the field effect transistor 23. The transmitter 12 and the receiver 14 are electrically connected only by the salt water in the tank 76.

Figure 20A:
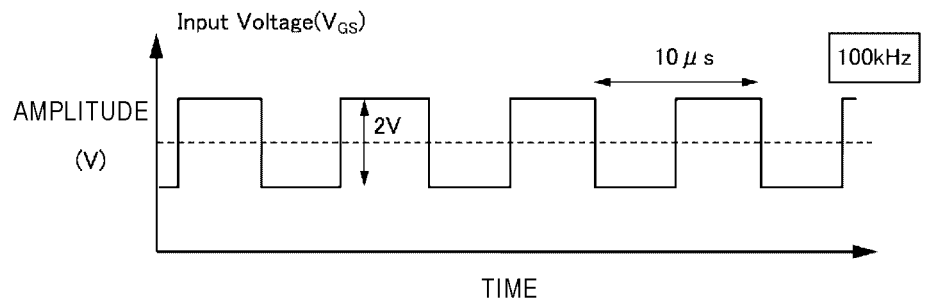
Figure 20B:
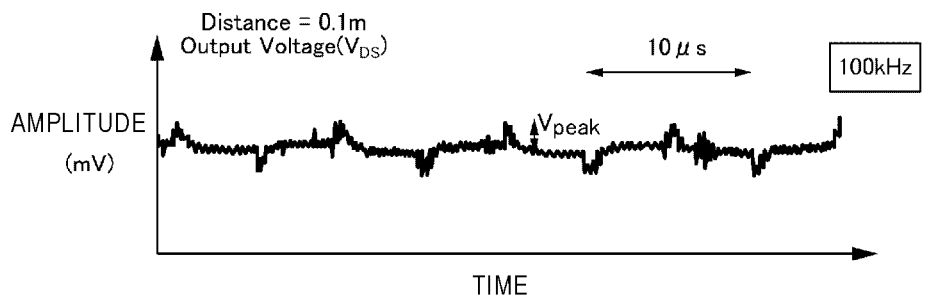
Figure 20C:
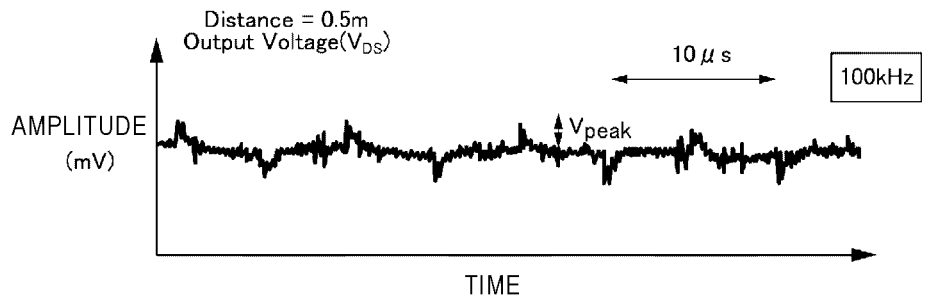

An output voltage $V_{DS}$ of the field effect transistor 23 with respect to the electric signal transmitted from the reference electrode 64 was measured when the distance between the reference electrode and the channel was 0.1 m and when the distance was 0.5 m. The results are shown in FIGS. 20A, 20B and 20C. In FIGS. 20A, 20B, and 20C, a horizontal axis represents the time (µs) and a vertical axis represents the amplitude (V) or (mV). FIG. 20A shows the electric signal (input signal) transmitted from the transmitter 12, FIG. 20B shows the output voltage $V_{DS}$ when the distance is 0.1 m, and FIG. 20C shows the output voltage $V_{DS}$ when the distance is 0.5 m.

With respect to a rectangular wave with a period of 10 µs and an amplitude of 2 V input from the reference electrode 64, the waveforms of the output voltage $V_{DS}$ of the field effect transistor 23 when the distance between the reference electrode and the channel was 0.1 m and when the distance was 0.5 m were both differential waveforms having peak voltages of 25 mV and 25 mV, respectively, according to the rising and falling timings of the rectangular wave.

Further, a similar experiment was conducted by filling a rectangular parallelepiped tank (capacity 420 L) having a length×depth×width of 100×70×60 cm with 300 L of the salt water. When the rectangular wave having an amplitude of 1 V and the frequency of 10 MHz was input from the reference electrode 64, the differential waveform similar to that in FIG. 20B was observed in the field effect transistor 23 when the distance between the reference electrode and the channel was 90 cm.

Figure 21:
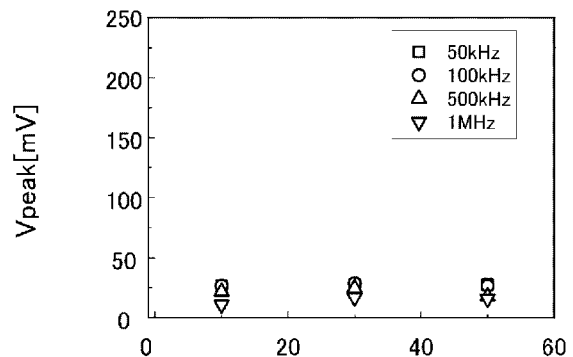
FIG. 21 is a graph showing an experimental result (10).

FIG. 21 shows the result of measuring the peak voltage of the output voltage $V_{DS}$ with respect to the distance between the reference electrode and the channel in the experimental device 74 (FIG. 19). In FIG. 21, a horizontal axis represents the distance between the reference electrode and the channel (cm), and a vertical axis represents the peak voltage (V) of the output voltage $V_{DS}$. From FIG. 21, it was clearly confirmed that the peak voltage of the output voltage $V_{DS}$ could be stably obtained in the field effect transistor 23 when the distance between the reference electrode and the channel was 10 cm to 50 cm with respect to the input signal of 50 kHz to 1 MHz.

Plasma ion vibration including positive and negative ions of the salt water is a propagation medium. A local potential change caused by the reference electrode causes a bias in a distribution of the positive and negative ions. It is considered that this bias of the distribution vibrates (a kind of plasma oscillation) and propagates in the salt water. In some cases, it is also considered that the waveform may move a long distance as a plasma soliton wave without breaking.

From the above results, it was confirmed that the underwater communication device provided with the reference electrode as the transmitting unit and the silicon ISFET as the receiving unit could transmit the digital signal via the salt water even when a signal potential and a receiving potential (source) are not common, that is, even when the transmitting unit and the receiving unit are not grounded using the common bus.

(Example 5) Verification Using Diamond SGFET and Independent Power Supply

Next, it was verified whether the receiving unit could receive the electric signal transmitted from the transmitting unit in the water when the diamond SGFET was used as the receiving unit, and the transmitting unit and receiving unit were not connected to the common ground bus and were connected to the independent power sources that were not electrically connected to each other. For the verification, a device was used in which the field effect transistor 23 in the experimental device 71 shown in FIG. 17 was replaced with the field effect transistor 24 using the diamond SGFET. As the field effect transistor 24, the same diamond SGFET as that in Example 1 was used. The transmitter 12 and the receiver 14 were electrically connected only by the salt water in the hose (inner diameter 2 cm) 68.

Figure 22:
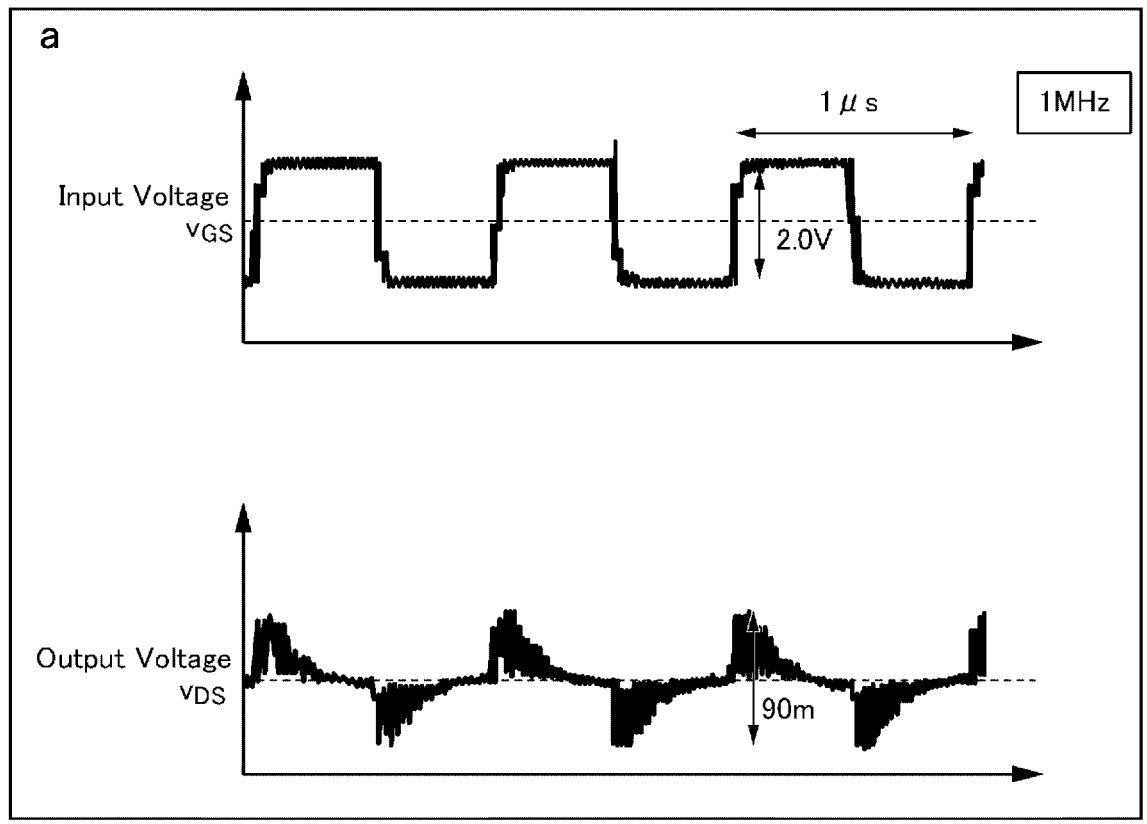
FIG. 22 is a graph showing an experimental result (11).
Figure 22:
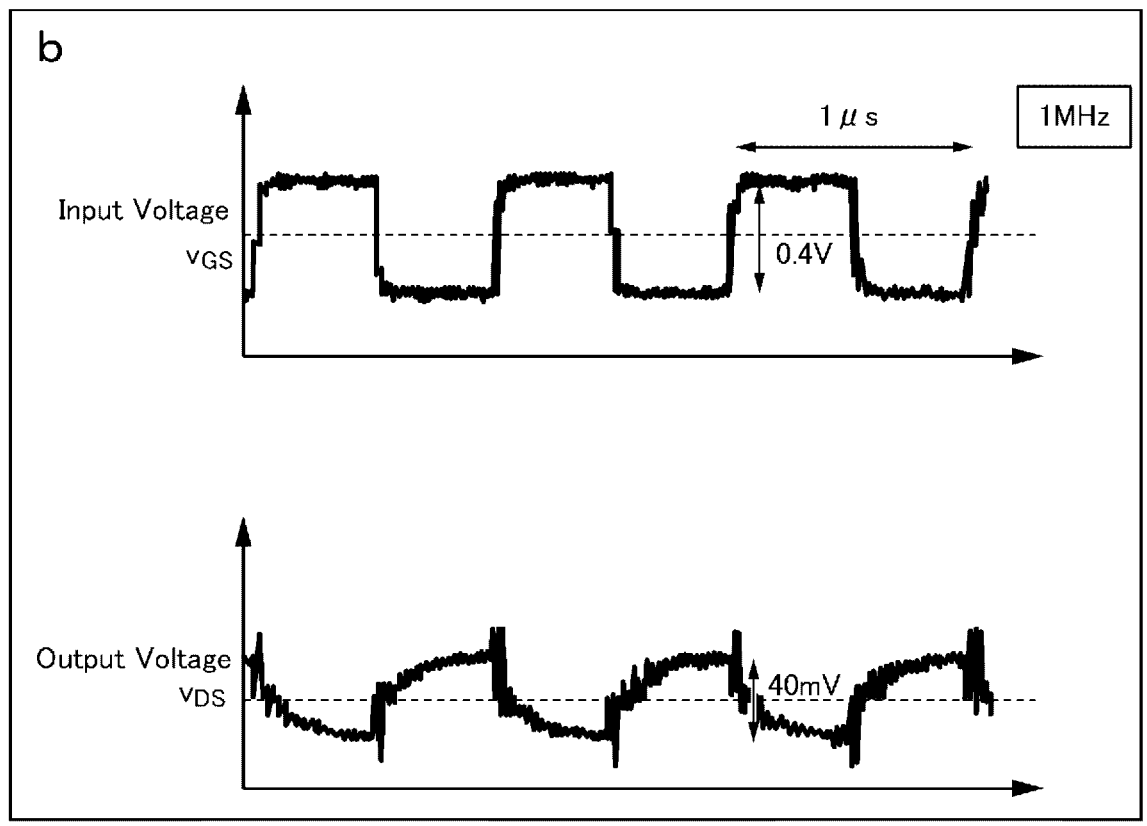

An output voltage $V_{DS}$ of the field effect transistor 24 with respect to the electric signal transmitted from the reference electrode 64 was measured when the distance between the reference electrode and the channel was 1 m. The results are shown in a of FIG. 22. Further, b of FIG. 22 shows the results of measuring the output voltage $V_{DS}$ of the field effect transistor 24 with respect to the electric signal transmitted from the reference electrode 64 in an experimental device having the same configuration except that the transmitter 12 and the receiver 14 are connected to the common ground bus and grounded. In a and b of FIG. 22, a horizontal axis represents the time (μs) and a vertical axis represents the amplitude (V) or (mV).

From a of FIG. 22, it was clear that when the frequency of the input signal was 1 MHz, with respect to a rectangular wave with a period of 1 μs and an amplitude of 2.0 V input from the reference electrode 64, a waveform of the output voltage $V_{DS}$ of the field effect transistor 23 was a differential waveform with a peak voltage of 90 mV.

From b of FIG. 22, it was clear that when the frequency of the input signal was 1 MHz, with respect to a rectangular wave with a period of 1 μs and an amplitude of 0.4 V input from the reference electrode 64, a waveform of the output voltage $V_{DS}$ of the field effect transistor 23 was an inverted sine wave at the same period and with an amplitude of 40 mV.

From the above results, it was confirmed that the waveform of the output voltage $V_{DS}$ was not affected by a direct current component of the input signal by not using the common bus.

It was confirmed that the underwater communication device provided with the reference electrode as the transmitting unit and the diamond SGFET as the receiving unit can transmit the digital signal via the salt water even when the signal potential and the receiving potential (source) were not common, that is, even when the transmitting unit and the receiving unit were not grounded using the common bus.

Figure 23:
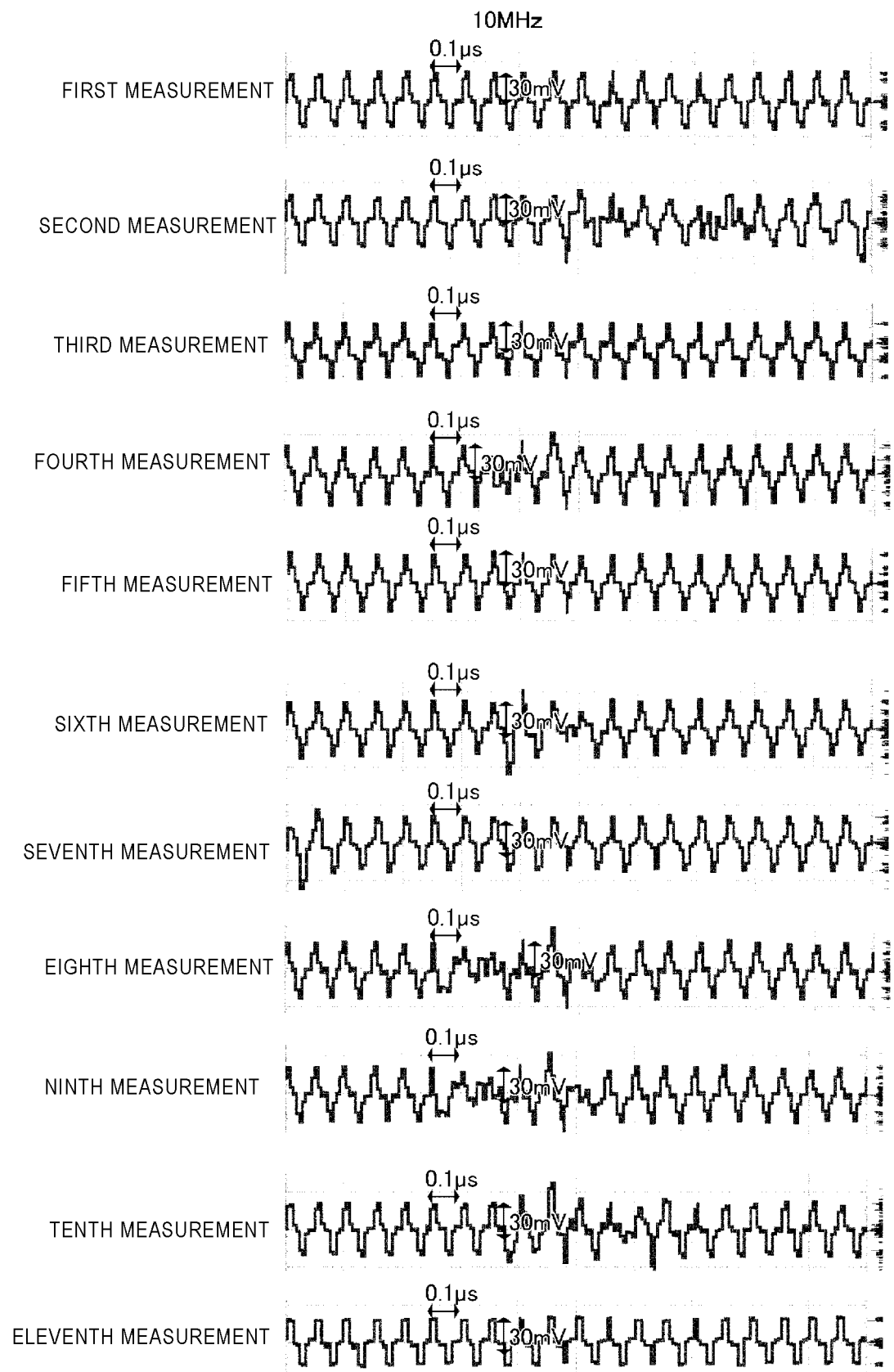
FIG. 23 is a graph showing an experimental result (12).

(Example 6) Reproducibility of Verification Using Silicon ISFET and Independent Power Supply An output voltage $V_{DS}$ of the field effect transistor 23 with respect to the electric signal of 10 MHz transmitted from the reference electrode 64 was measured repeatedly using the experimental device 71 (FIG. 17) of Example 4, when the distance between the reference electrode and the channel was 90 cm. The results are shown in FIG. 23. In FIG. 23, a horizontal axis represents the time (μs) and a vertical axis represents the amplitude (mV) of the output voltage $V_{DS}$.

From FIG. 23, it was clear that with respect to a rectangular wave with a period of 0.1 μs and an amplitude of 1 V input from the reference electrode 64, a waveform of the output voltage $V_{DS}$ of the field effect transistor 23 was a differential waveform with the same period. The waveforms of the output voltage were almost the same from a first time to an eleventh time. From the fact, it was confirmed that the underwater communication device provided with the reference electrode as the transmitting unit and the silicon ISFET as the receiving unit can perform highly reproducible communication.

REFERENCE SIGN LIST 10 underwater communication device
12 transmitter
14 receiver
23, 24 field effect transistor
26 drive circuit
31 source region
32 source electrode
33 drain region
34 drain electrode
35, 36, 37, 38 protective film
39, 40 channel region

The invention claimed is:

1. An underwater communication device, comprising:
a transmitter configured to transmit an electric signal; and
a receiver arranged away from the transmitter via water and configured to receive the electric signal, wherein the receiver includes:
a field effect transistor having a channel region provided at a position in contact with the water; and
a drive circuit configured to generate a potential difference between a source region and a drain region of the field effect transistor.

2. The underwater communication device according to claim 1, wherein a protective film is provided on the source region and the drain region.

3. The underwater communication device according to claim 1, wherein the transmitter and the receiver are arranged away from each other at a distance of 1 m or more.

4. The underwater communication device according to claim 1, wherein a frequency of the electric signal is 1 kHz to 10 MHz.

5. The underwater communication device according to claim 1, wherein the water is seawater.

6. An underwater communication method, comprising:
   transmitting an electrical signal in water; and
   receiving the electrical signal via the water, wherein
   in the receiving, the electric signal is received by a field effect transistor having a channel region provided at a position in contact with the water.

* * * * *